United States Patent
Bidner et al.

(10) Patent No.: US 9,683,483 B1
(45) Date of Patent: Jun. 20, 2017

(54) EXHAUST LEAKAGE MANAGEMENT

(71) Applicant: Ford Global Technologies, LLC, Dearborn, MI (US)

(72) Inventors: David Karl Bidner, Livonia, MI (US); Jack Adams, Belleville, MI (US); Mrdjan J. Jankovic, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/072,928

(22) Filed: Mar. 17, 2016

(51) Int. Cl.
*F02B 25/06* (2006.01)
*F02D 23/00* (2006.01)
*F02B 33/44* (2006.01)
*F02B 27/04* (2006.01)
*F01N 3/02* (2006.01)
*F02B 37/18* (2006.01)
*F02B 39/14* (2006.01)
*F01M 13/02* (2006.01)

(52) U.S. Cl.
CPC ......... *F02B 37/183* (2013.01); *F01M 13/028* (2013.01); *F02B 39/14* (2013.01)

(58) Field of Classification Search
CPC ....... F02B 37/183; F02B 39/14; F01M 13/00; Y02T 10/144
USPC ........... 60/280, 287, 288, 602, 605.2, 605.3
See application file for complete search history.

(56) References Cited

U.S. PATENT DOCUMENTS

| | | | | |
|---|---|---|---|---|
| 4,171,936 A | * | 10/1979 | Hageman | F02B 37/18 417/407 |
| 4,454,852 A | * | 6/1984 | Hasegawa | F02M 26/55 123/480 |
| 5,941,506 A | * | 8/1999 | Smith | F01D 11/00 137/312 |
| 6,089,019 A | * | 7/2000 | Roby | F02M 26/51 123/568.11 |
| 6,217,001 B1 | * | 4/2001 | Gluchowski | F02M 26/67 251/129.07 |
| 6,394,078 B1 | * | 5/2002 | Kling | F01M 13/022 123/572 |
| 6,418,916 B1 | * | 7/2002 | Newmann | F01M 13/02 123/559.1 |
| 9,103,271 B2 | | 8/2015 | Bidner et al. | |

* cited by examiner

*Primary Examiner* — Mark Laurenzi
*Assistant Examiner* — Dapinder Singh
(74) *Attorney, Agent, or Firm* — Julia Voutyras; McCoy Russell LLP

(57) ABSTRACT

Methods and systems are provided for exhaust leak management in an engine. The exhaust leakage management system may include a port disposed to capture leaked exhaust along a movable portion associated with a turbine. The exhaust leakage management system may also include a three-way valve at a bifurcation of the port, directing leaked exhaust either to a first passage fluidically connected to a crankcase of the engine or to a second passage fluidically connected to a downstream portion of an exhaust pipe, depending on engine operating conditions.

20 Claims, 4 Drawing Sheets

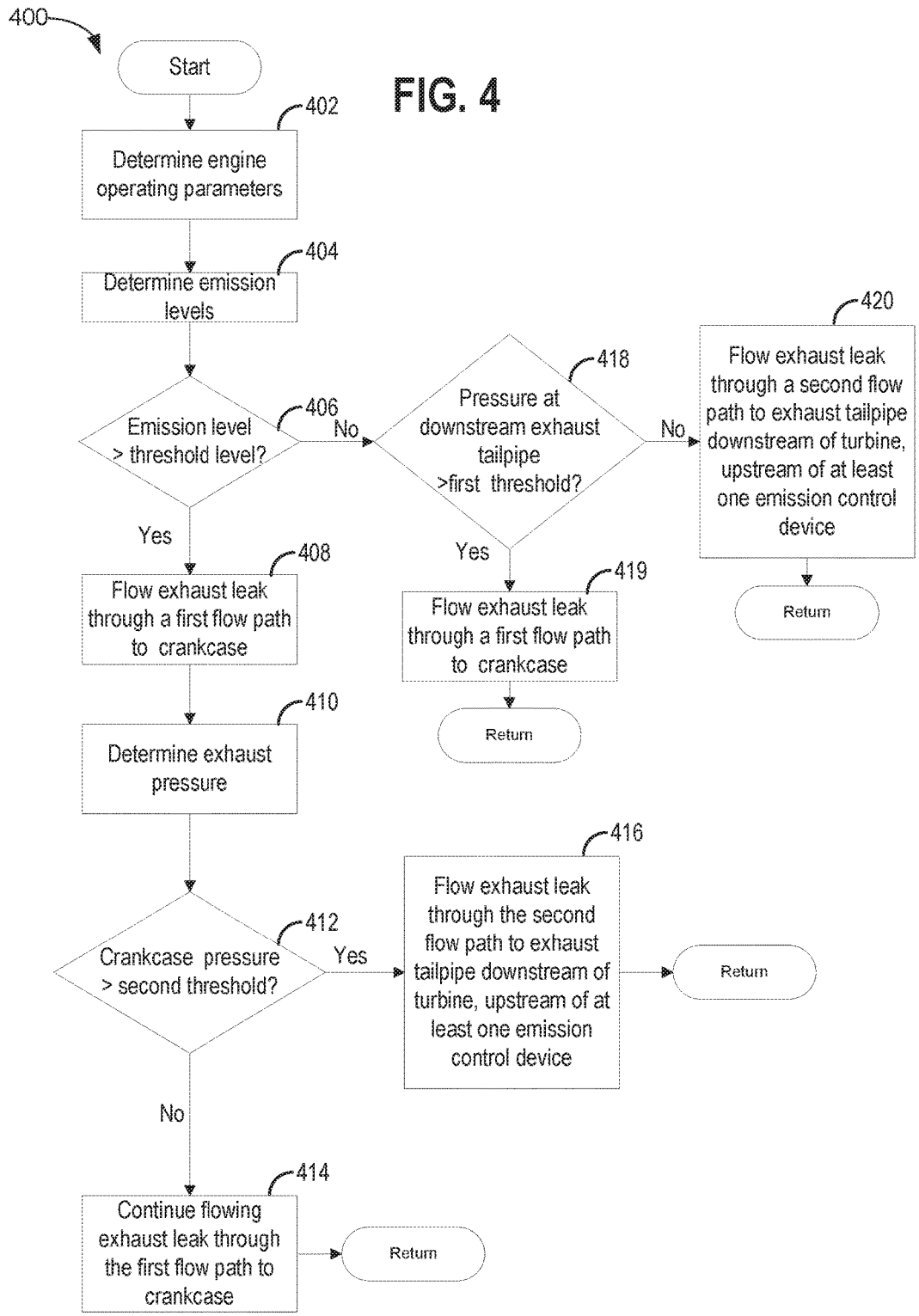

EXHAUST LEAKAGE MANAGEMENT

FIELD

The present application relates to controlling, and/or managing possible exhaust gas leaks from various engine components and directing the leaks to a crankcase ventilation system or to a downstream exhaust pipe for more advantageous handling.

BACKGROUND AND SUMMARY

Turbochargers include various components to handle flow of fluids such as exhaust gas. For example, some turbochargers may include a wastegate to divert exhaust gas flow around the turbocharger and/or a mechanical shaft to control tuning of a turbine of the turbocharger. These components may pass through one or more walls of the turbine housing, creating potential leak paths for leakage of exhaust gas out of the turbocharger. Conventional seals may not be suitable to prevent leakage of exhaust gas from around the mechanical shafts, as the shafts are associated with the turbine at areas of very high exhaust pressure and temperature. Hence, conventional seals may not be able to withstand these extreme conditions.

One example approach for managing flow of leaked exhaust gas is shown in U.S. Pat. No. 9,103,271 and includes capturing leaked exhaust gas through a port intersecting with a pair of bushings around a wastegate valve shaft and directing the captured leaked exhaust gas from the port to an engine crankcase, thereby preventing the leaked exhaust gas from escaping to atmosphere.

The inventors herein recognize that in the above-described approach, the leaked exhaust gas may be routed to the crankcase even in conditions when emission parameters and pressure parameters along an exhaust pipe are conducive for flowing leaked exhaust through one or more emission control devices to atmosphere, thereby increasing the crankcase pressure. The engine crankcase is designed to operate at relatively low pressure and abnormally high crankcase pressure nay result in oil leaks. To manage the exhaust leaks associated with movable portions in contact with exhaust gas flow more efficiently, the inventors herein provide an exhaust gas leakage management system and a method for operating the exhaust gas leakage management system based on engine operating parameters.

In one example, an exhaust gas leakage management system may include a port disposed to capture a leaked exhaust gas from an insertion region of an exhaust gas flow component, a first passage at a bifurcation of the port, the first passage fluidically connecting the port to an engine crankcase, a second passage at the bifurcation of the port, the second passage fluidically connecting the port to a downstream portion of an exhaust pipe, and a three-way valve at the bifurcation of the port, the three-way valve regulating flow of the leaked exhaust gas through the port to the first passage and to the second passage. The insertion region may be along a movable shaft inserted into a turbine.

An example method for managing the flow of leaked exhaust gas may include, responsive to a first condition, positioning a three-way valve in a first position to flow leaked exhaust gas from a port through a first passage to an engine crankcase, the port capturing the leaked exhaust gas from an insertion portion of a moveable shaft, the three-way valve positioned at a bifurcation of the port, and responsive to a second condition, positioning the three way valve in a second position to flow leaked exhaust gas from the port through a second passage to a downstream portion of an exhaust pipe.

In this way, the leaked exhaust gas from the area around the movable shaft associated with the turbine housing may be managed by directing the leaked exhaust gas to flow to the crankcase of the engine or by directing the leaked exhaust to flow to the downstream exhaust pipe, depending on pressure and emission level parameters. The above described exhaust leakage management system may prevent degradation of emissions due to the leaked exhaust gas escaping to atmosphere and may ensure that the engine crankcase handles some of the leaked exhaust gas, while maintaining the crankcase pressure within a desired range for efficient crankcase operation.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 4 shows a flowchart with a method for regulating flow of leaked exhaust gases in a turbocharger of an engine.

DETAILED DESCRIPTION

The following description is a non-limiting example of systems and methods for managing exhaust gas leaked from around a movable shaft associated with a turbine housing. Unwanted leakage of exhaust gas from a turbocharger may happen via one or more clearances around bushings that support shafts associated with a turbine of the turbocharger, for example, mechanical shafts employed to control the tuning of the turbine. The bushings surrounding the mechanical shaft may continuously leak exhaust gases, which may escape to atmosphere and can influence emissions negatively. Managing the flow of the leaked exhaust gas such that the leaked exhaust gas does not degrade emissions may include capturing and flowing the leaked exhaust gas based on emission guidelines and engine operating conditions. According to embodiments disclosed herein, the leaked exhaust gas may be captured and directed to one or both of an engine crankcase and exhaust passage downstream of the turbine.

Figure 1:
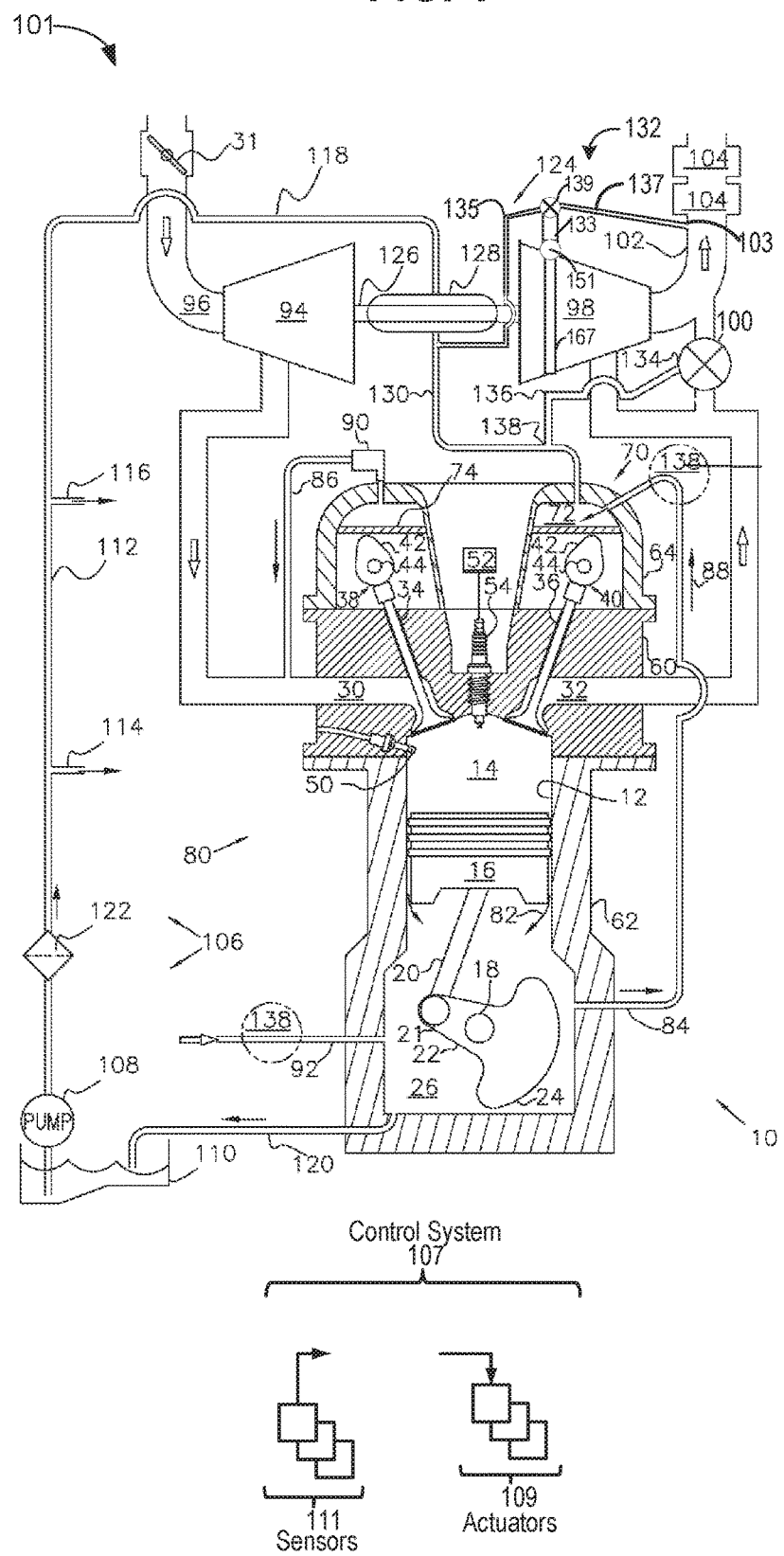
FIG. 1 shows an example engine system with an exhaust gas leak management system.
Figure 2:
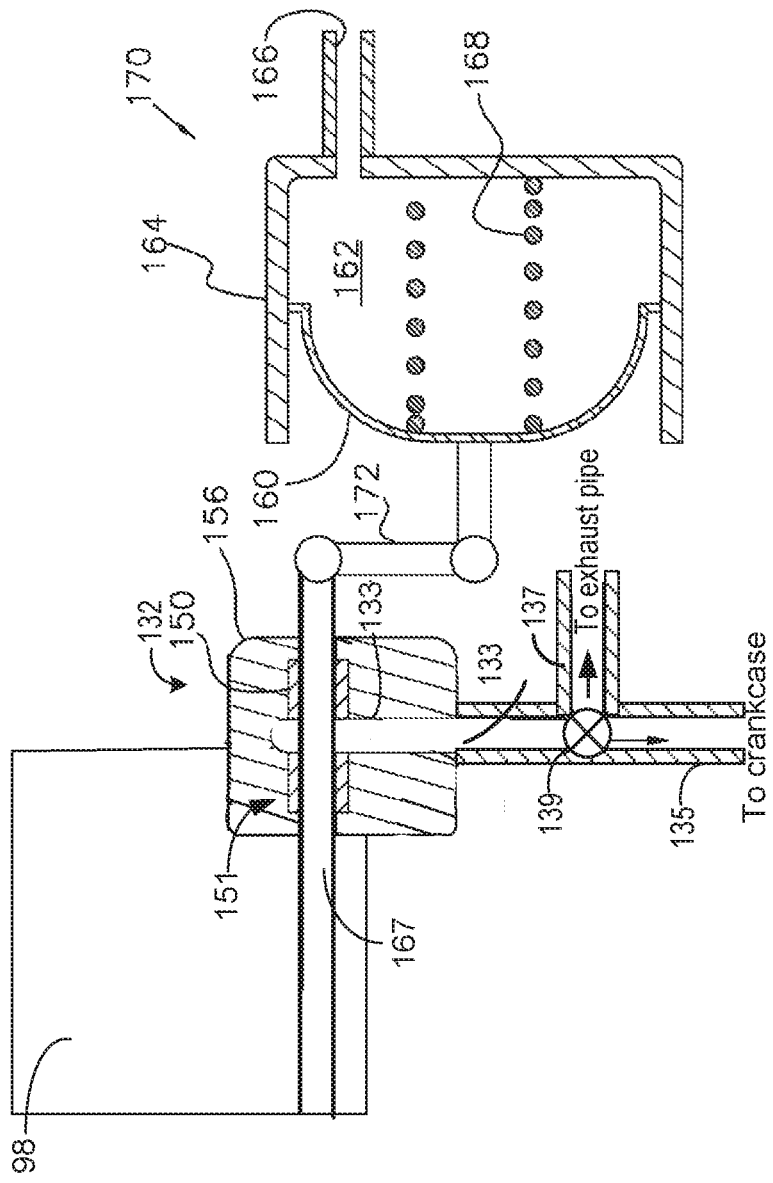
FIG. 2 shows a view of an exhaust gas leak management system associated with a shaft passing through a turbine housing.
Figure 3:
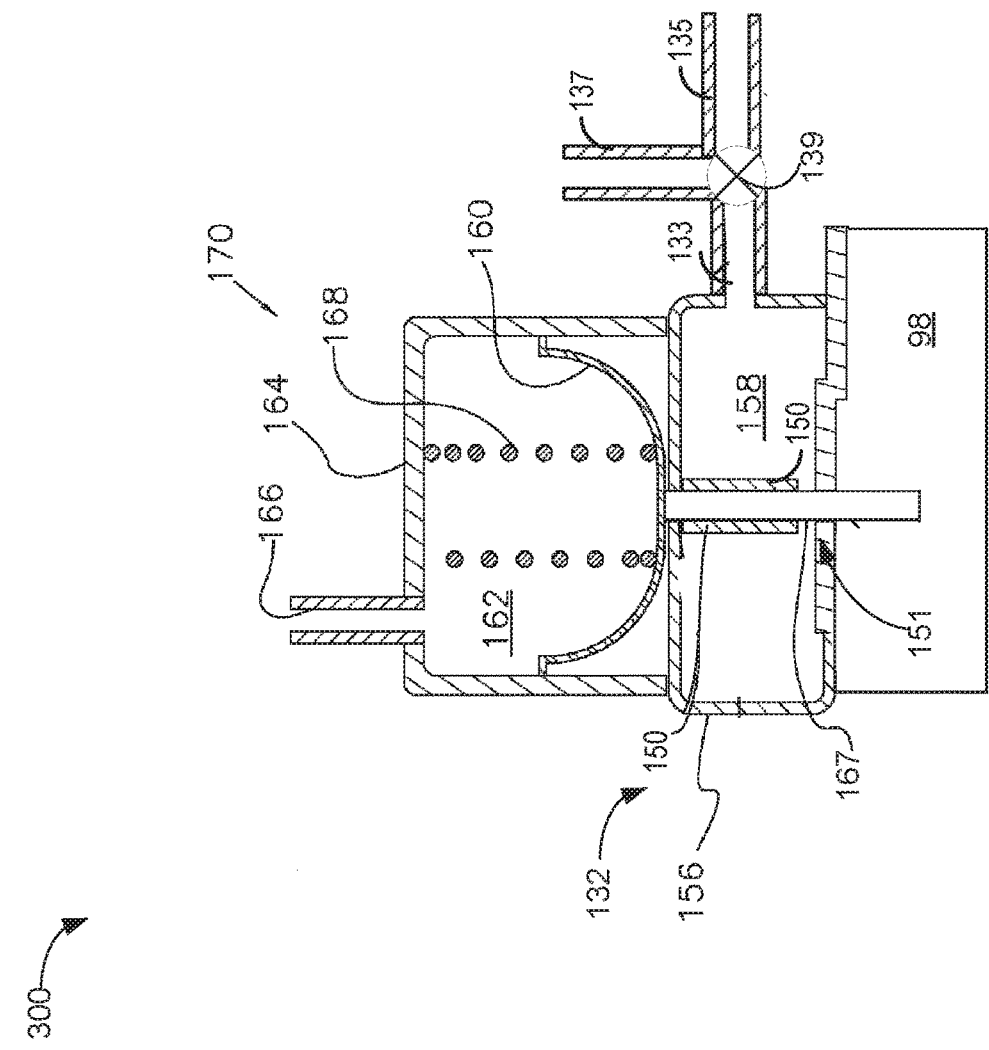
FIG. 3 illustrates another embodiment an exhaust gas leak management system associated with a shaft passing through a turbine housing.

FIG. 1 illustrates a cylinder of an engine including a crankcase and a turbocharger with a movable shaft associated with a turbine. FIGS. 2 and 3 illustrate an insertion region where the movable shaft inserted in the turbine is associated with an exhaust gas leakage management system, including a port capturing the leaked exhaust gas. The port bifurcates into two different passages to direct leaked exhaust gas either to the crankcase of the engine or to a downstream portion of an exhaust pipe, and may be controlled according to a method illustrated in a flowchart in FIG. 4.

FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

FIG. 1 is a cross-sectional view 101 through a cylinder 12 of an engine 10. Various components of the engine 10 may be controlled at least partially by a control system that may include a controller 107, receiving input from sensors 111. The sensors 111 may include oxygen sensors, brake pedal sensors, accelerator pedal sensors, pressure sensor, etc. Based on input from the sensors 111, the controller 107 employs various actuators 109 to adjust engine operation based on the received signals and instructions stored on a memory of the controller. The cylinder 12 may include a combustion chamber 14. A piston 16 may be positioned within the cylinder 12 for reciprocating movement therein. The piston 16 may be coupled to a crankshaft 18 via a connecting rod 20, a crank pin 21, and a crank throw 22 shown here combined with a counterweight 24. Some examples may include a discrete crank throw 22 and counterweight 24. The reciprocating motion of the piston 16 may be translated into rotational motion of the crankshaft 18. The crankshaft 18, connecting rod 20, crank pin 21, crank throw 22, and counterweight 24, and possibly other elements not illustrated may be housed in a crankcase 26. The crankcase 26 may hold oil. Crankshaft 18 may be coupled to at least one drive wheel of a vehicle via an intermediate transmission system. Further, a starter motor may be coupled to crankshaft 18 via a flywheel to enable a starting operation of engine 10.

Combustion chamber 14 may receive intake air from an intake passage 30 and may exhaust combustion gases via exhaust passage 32. Intake passage 30 and exhaust passage 32 may selectively communicate with combustion chamber 14 via respective intake valve 34 and exhaust valve 36. A throttle 31 may be included to control an amount of air that may pass through the intake passage 30. In some embodiments, combustion chamber 14 may include two or more intake valves and/or two or more exhaust valves.

In this example, intake valve 34 and exhaust valve 36 may be controlled by cam actuation via respective cam actuation systems 38 and 40. Cam actuation systems 38 and 40 may each include one or more cams 42 and may utilize one or more of cam profile switching (CPS), variable cam timing (VCT), variable valve timing (VVT) and/or variable valve lift (VVL) systems that may be operated by the controller 107 to vary valve operation. The cams 42 may be configured to rotate on respective revolving camshafts 44. As depicted, the camshafts 44 may be in a double overhead camshaft (DOHC) configuration, although alternate configurations may also be possible. The position of intake valve 34 and exhaust valve 36 may be determined by position sensors (not shown). In alternative embodiments, intake valve 34 and/or exhaust valve 36 may be controlled by electric valve actuation. For example, cylinder 16 may include an intake valve controlled via electric valve actuation and an exhaust valve controlled via cam actuation including CPS and/or VCT systems.

In one embodiment, twin independent VCT may be used on each bank of a V-engine. For example, in one bank of the V, the cylinder may have an independently adjustable intake cam and exhaust cam, where the cam timing of each of the intake and exhaust cams may be independently adjusted relative to crankshaft timing.

Fuel injector 50 is shown coupled directly to combustion chamber 14 for injecting fuel directly therein in proportion to a pulse width of a signal that may be received from the controller 107. In this manner, fuel injector 50 provides what is known as direct injection of fuel into combustion chamber 14. The fuel injector 50 may be mounted in the side of the combustion chamber 14 or in the top of the combustion chamber 14, for example. Fuel may be delivered to fuel injector 50 by a fuel system (not shown) including a fuel tank, a fuel pump, and a fuel rail. In some embodiments, combustion chamber 14 may alternatively or additionally include a fuel injector arranged in intake passage 30 in a configuration that provides what is known as port injection of fuel into the intake port upstream of combustion chamber 14.

Ignition system 52 may provide an ignition spark to combustion chamber 14 via spark plug 54 in response to a spark advance signal from the controller 107, under select operating modes. Though spark ignition components are shown, in some embodiments the combustion chamber 14 or one or more other combustion chambers of engine 10 may be operated in a compression ignition mode, with or without an ignition spark.

Cylinder head 60 may be coupled to a cylinder block 62. The cylinder head 60 may be configured to operatively house, and/or support, the intake valve(s) 34, the exhaust valve(s) 36, the associated valve actuation systems 38 and 40, and the like. Cylinder head 60 may also support camshafts 44. A cam cover 64 may be coupled with and/or mounted on the cylinder head 60 and may house the associated valve actuation systems 38 and 40, and the like. Other components, such as spark plug 54 may also be housed and/or supported by the cylinder head 60. A cylinder block 62, or engine block, may be configured to house the piston 16. In one example, cylinder head 60 may correspond to a cylinder 12 located at a first end of the engine. While FIG. 1 shows only one cylinder 12 of a multi-cylinder engine 10, each cylinder 12 may similarly include its own set of intake/exhaust valves, fuel injector, spark plug, etc.

FIG. 1 also illustrates an oil separator 70, which may include an oil separation chamber 72 and bottom plate 74, which may define a bottom of the oil separation chamber 72. The oil separator 70 may be included in the cam cover 64 as illustrated, or may be located in another location within, or associated with, the engine 10. The bottom plate 74, and/or the oil separation chamber 72 may be mounted on, or in and/or supported by cylinder head 60. The oil separator 70 may extend lengthwise along a portion of the length of the engine bank, that is, in a direction parallel with the axes of the camshafts 44. Oil separator 70 may be considered to include the cam cover 64. One or more baffles (not shown) may be included with the oil separator 70.

Oil separator 70 may be included as part of an engine crankcase ventilation system 80. The engine crankcase ventilation system 80 may be a positive crankcase ventilation system, or (PCV) system 80. The engine crankcase ventilation system 80 may be included with the engine 10 to mitigate an amount of undesirable exhaust gases that may be emitted from the engine 10. During operation, some blow-by gasses 82, as illustrated in FIG. 1 with arrows may pass from the combustion chamber 14 to the crankcase 26. Some of the blow-by gasses 82 may be incompletely combusted, and may be reintroduced into the combustion chamber 14 via a first crankcase ventilation line 84, a second crankcase ventilation line 86, and the intake passage 30 in an attempt to combust them more completely. However, the blow-by gasses 82 may include suspended oil picked up in the stream of gasses from one or more locations within the engine such as the crankcase 26. In an attempt to separate the suspended oil from the blow-by gasses 82 the mixture of oil and blow-by gasses 88, as illustrated with an arrow may be first passed through the oil separator 70.

A flow level of the crankcase ventilation gases through the engine crankcase ventilation system 80 may be controlled by one or more mechanisms, which may include a valve 90. In some cases, the valve 90 may be referred to as a Positive Crankcase Ventilation (PCV) valve. In some cases a breather tube 92 or breather passage, or the like, may be included to add clean air into the crankcase 26 in order to purge, or reduce the concentration of undesirable crankcase gases. In some cases, the breather tube 92 may be fluidically coupled with the intake manifold, and/or intake passage 30 as a source of clean air. A turbo compressor 94 may be disposed on an induction air path 96 for compressing an induction fluid before the induction fluid is passed to the intake passage 30 of the engine 10. In some applications, an inter-cooler (not shown) may be included to cool the intake charge before it enters the engine. The turbo compressor 94 may be driven by a turbine 98, which may be driven by exhaust gasses leaving the exhaust passage 32. In some cases, the throttle 31 may be downstream from the turbo compressor 94 instead of upstream as illustrated. Although not illustrated, the engine 10 may include an exhaust gas recirculation EGR line and/or EGR system.

In one example, the turbine 98 may be a variable geometry turbine (VGT) that includes a movable shaft 167 connected to an actuator for tuning the turbine. Varying a geometry/angle of vanes of the turbine through the movable shaft 167 may enable the turbine to provide desired boost at different engine speeds, including at low engine speeds. In another example, more than one movable shaft may associate with the turbine to provide the desired boost.

The engine 10 may include a wastegate 100 configured to divert exhaust gases away from the turbine 98 and to an exhaust pipe 102. Diverting the exhaust gases may help regulate the speed of the turbine 98, which in turn may regulate the rotating speed of the turbo compressor 94. The wastegate 100 may be configured as a valve. The wastegate 100 may be used to regulate, for example, a maximum boost pressure in the turbocharger system, which may help protect the engine and the turbocharger. In some examples, the engine may not include a wastegate and boost pressure may be regulated by the movable shaft 167 coupled to the turbine 98.

The exhaust pipe 102 may include one or more emission control devices 104, which may be mounted in a close-coupled position in the exhaust pipe 102. The one or more emission control devices 104 may include, for example, a three-way catalyst, lean NOx trap, diesel particulate filter, oxidation catalyst, etc.

The engine 10 may include an engine lubrication system 106, for example an oil lubrication system, which may include an oil pump 108, or other actuation means, to pump, and/or to pressurize, oil to move through the lubrication system 106. The oil pump 108 may be configured to suck oil from an oil reservoir, stored in oil pan 110, through a supply channel 112. The lubrication system 106 may include various branches 114, 116, 118 to provide oil to various oil subsystems. Oil may be returned through one or more return paths, which may include a return channel 120 wherein the oil may run or drip back to the oil pan 110. Oil may be filtered with oil filter 122. The oil subsystems may utilize oil flow to perform some function, such as lubrication, actuation of an actuator, etc. Example, subsystems may include lubrication systems, such as passageways for delivering oil to moving components, such as the camshafts, cylinder valves, etc. Other oil subsystems may include hydraulic systems with hydraulic actuators and hydraulic control valves. There may be fewer or more oil subsystems than as shown in the illustrated example.

One oil subsystem may be a turbine bearing lubrication system 124, which may receive oil via a turbine oil supply branch 118. The turbo compressor 94 may be coupled for rotation with the turbine 98 via a turbine shaft 126. The turbine shaft 126 may be supported for rotation by turbine bearings 128, and may be lubricated with the turbine bearing lubrication system 124. The oil may be returned to other parts of the engine 10 for recirculation, filtration, etc. via oil return line 130.

A shaft of the wastegate 100 may insert into the turbine 98, resulting in leakage of exhaust gas from an area of the insertion. In one example, exhaust gas leaked from the wastegate 100 may not be directed to the exhaust pipe 102 since exhaust pressure in the area where the shaft of the wastegate inserts into the turbine may be close to or equal to exhaust pressure at the exhaust pipe 102 downstream of the turbine. Hence, the only lower pressure area where leaked exhaust gas from the wastegate 100 may be directed to is the crankcase 26. In one example, a port 134 may direct flow of leaked exhaust gases from the wastegate 100 to the port 136. The port 136 at one or more junctures 138 may fluidically connect to the positive crankcase ventilation system (PCV) system 80. In some embodiments, the port 136 may be fluidically coupled with the crankcase 26 via the oil return line 130 for a turbine bearing 128 of a turbocharger. In some embodiments, the port may be fluidically coupled with the crankcase via the cam cover 64. In some embodiments, the port 136 may be fluidically coupled with the crankcase 26 via the cylinder head 60. In some embodiments, the port 136 may be fluidically coupled with the crankcase 26 via the breather passage 92 of the positive crankcase ventilation (PCV) system 80 via a turbocharger bearing oil return line 130. In this way, gasses leaked from the wastegate may be managed, or handled by the PCV system 80 rather than be leaked to the atmosphere.

The engine 10 may also include other potential areas where exhaust gas may leak and may contribute to emission quality, for example, exhaust gases leaking at a location where the movable shaft 167 inserts into a turbine housing. In one example, the movable shaft 167 may be a mechanical shaft for controlling the tuning the turbine. The movable shaft 167 may insert into the turbine 98 and engage with vanes of the turbine. The mechanical shaft may be a rotating or a traversing shaft, capable of altering an angle of the vanes of the turbine, thereby regulating the boost generated by the turbine 98. In another example, more than one mechanical shaft may be present. In a further example, the movable shaft may be a valve stem. In some cases, the exhaust leak may be through small clearances between mating parts, and/or due to imperfect and/or aging seals along the movable shaft 167 at an insertion region 151 (also, illustrated in FIGS. 2 and 3), where the movable shaft 167 inserts into the turbine 98. If more than one movable shaft are coupled to the turbine, exhaust may leak from the insertion region of each of the movable shaft. In many cases, the leak(s) may be small but may still be noticeable and/or detectable. As emission sources are increasingly scrutinized relatively smaller leaks may be increasingly significant.

Embodiments in accordance with the present disclosure may provide an exhaust gas management system 132 for the engine 10. The exhaust gas leakage management system 132 may include a port 133 disposed to capture an exhaust gas leaked from the insertion region 151 of the movable shaft 167. In one example, more than one exhaust leakage management system may be present, wherein more than one movable shaft may be associated with the turbine, and each of the exhaust leakage management system may be associated with a movable shaft. The port 133 may bifurcate into a first passage 135 and a second passage 137. The first passage 135 may fluidically connect to the crankcase 26, directing leaked exhaust gas to the crankcase 26 of the engine 10. The second passage 137 may fluidically connect to a downstream portion 103 of the exhaust pipe 102 (e.g., downstream of the turbine), directing leaked exhaust gas to flow through the one or more emission control devices 104 to atmosphere.

The first passage 135 may be fluidically coupled with the crankcase 26 via the oil return line 130 for a turbine bearing 128 of a turbocharger. In some embodiments, the first passage 135 may be fluidically coupled with the crankcase via the cam cover 64. In some embodiments, the first passage 135 may be fluidically coupled with the crankcase 26 via the cylinder head 60. In some embodiments, the first passage 135 may be fluidically coupled with the crankcase 26 via the breather passage 92 of the positive crankcase ventilation (PCV) system 80 via the turbocharger bearing oil return line 130.

In one example, a valve 139 may be present at a bifurcation of the port 133 to the first passage 135 and the second passage 137. The valve 139 may be positioned to regulate captured exhaust leak from the port 133 either through the first passage or through the second passage based on engine operating conditions, such as emission levels and/or exhaust pressure, as will be discussed below with reference to FIG. 4. The controller 107 may include instructions to actuate an actuator (where the actuator may be electric, pneumatic, hydraulic etc.) coupled to the valve 139 responsive to the operating conditions, to position the valve 139 to direct leaked exhaust flow either through the first passage 135 to the crankcase 26 via the turbocharger bearing oil return line 130 or through the second passage 137 to the downstream portion 103 of the exhaust pipe. In this way, even a relatively small exhaust leak may be controlled and managed.

The controller 107 may receive signals from the various sensors of FIG. 1 (as well as sensors illustrated in FIGS. 2-4, described below) and employs the various actuators of FIG. 1 and FIGS. 2-4, to adjust engine operation based on the received signals and instructions stored on a memory of the controller.

FIG. 2 shows an embodiment 200 and FIG. 3 shows another embodiment 300 of the exhaust gas leakage management system 132 associated with the movable shaft 167 coupled to the turbine 98. Each embodiment of the exhaust gas leakage management system 132 may be used with the example engine 10 illustrated in FIG. 1, or other engine types. The features of the exhaust leakage management system are described in relation to FIG. 1. Components previously introduced in FIG. 1 are numbered similarly and not reintroduced.

In one example, the movable shaft 167 may be a mechanical shaft inserting into the turbine for tuning the turbine. In another example, the movable shaft 167 may be a valve stem associated with the turbine. The movable shaft 167 may be coupled to an actuator 170. The actuator may be located outside the turbine and may couple to the movable shaft 167 inserting into the turbine. In one example, the movable shaft 167 may be actuated by a lever 172.

The movable shaft 167 may insert into the turbine at the insertion region 151. The movable shaft 167 coupled to the actuator 170 may be disposed for movement, including at the insertion region 151. The insertion region 151 may be a potential region where exhaust gas may leak from the turbine 98. In one example, a pair of bushings 150 may encircle the movable shaft 167 at the insertion region 151. There may be small spaces/gaps between the pair of bushings 150 and the movable shaft, enabling exhaust gas to escape from the turbine 98.

The exhaust leakage management system 132 may be associated with the movable shaft 167 at the insertion region 151. The exhaust leakage management system 132 may include an enclosure 156 in sealing engagement with the pair of bushings 150 encircling the movable shaft 167. In one example, part of the movable shaft 167 at the insertion region 151 may be in engagement with the enclosure 156 directly, without the pair of bushings 150. Exhaust gas may also leak through gaps between mating surfaces of the enclosure 156 and the pair of bushings 150 and through gaps between mating surfaces of the enclosure 156 and the movable shaft 167. Additionally, as described above, exhaust gas may leak from the small spaces between the pair of bushings 150 and the movable shaft 167.

The exhaust management system 132 may include the port 133 to capture the leaked exhaust gas at the insertion region 151. The port 133 may be disposed to intersect with the movable shaft 167 between the pair of bushings 150 at the insertion region 151, as illustrated in FIG. 2. The port 133 may capture the leaked exhaust gas from around the pair of bushings interfacing with the movable shaft 167 and direct the leaked exhaust gas to flow along the port 133 to outside of the enclosure 156. In one example, a radial groove on the port 133 may define a fluid path along which the leaked exhaust gas from around the pair of bushings may be directed to flow along the port 133 through the enclosure 156 to outside of the enclosure 156.

The port 133 may bifurcate to the first passage 135, directing the leaked exhaust gas to the crankcase 26 of the engine 10 and to the second passage 137, directing the leaked exhaust gas to the downstream portion 103 of the exhaust pipe. In one example, the port 133 may bifurcate to the first passage 135 and the second passage 137 outside the enclosure 156. In another example, the port 133 may bifurcate while still within the enclosure 156, then the first passage and the second passage may pass through and out of the enclosure 156 and continue to the crankcase or to the downstream portion 103 of the exhaust pipe, respectively.

The exhaust leakage management system 132 also includes the valve 139, which may be present at a bifurcation of the port 133. Depending on the location of the bifurcation of the port 133 (bifurcating inside the enclosure 156 or outside the enclosure 156), the position of the valve 139 may be inside the enclosure 156 or outside the enclosure 156 (as shown in FIG. 2). The valve 139 may be a three-way valve configured to flow the leaked exhaust gas from the port 133 either to the first passage 135 (fluidically connecting to the crankcase system) or to the second passage 137 (fluidically connecting to the downstream portion of the exhaust pipe). The valve 139 may be coupled to an actuator (for example, electric actuator, pneumatic actuator, etc.). A position of the valve 139 may be controlled by a controller (for example, the controller 107 of FIG. 1) based on input from various sensors, as will be described below with reference to FIG. 4.

In the embodiment 200 illustrated in FIG. 2, the movable shaft 167 may be coupled with a diaphragm 160 which may be moveable in accordance with a pressure within a volume 162 defined between the diaphragm 160 and an encasement 164. The pressure may be varied in accordance with a fluidic connection 166. The fluidic connection 166 may be a boost controller port. A spring 168 may be included to bias the movable shaft 167 to, for example, a closed position.

FIG. 3 illustrates the embodiment 300 of the exhaust gas leakage management system associated with the movable shaft 167, where the leaked exhaust gas along the insertion region 151 may flow past the pair of bushings 150 and may be captured by the port 133, where the port 133 includes a volume 158 inside the enclosure 156. The leaked exhaust gas may be captured in the volume 158 and flow out of the enclosure 156 through the port 133. The port 133 may then bifurcate to the first passage 135 and the second passage 137. The valve 139 at the bifurcation may direct the leaked exhaust to flow through the first passage or through the second passage, depending on engine operating parameters.

FIG. 4 illustrates a method 400 for regulating flow of leaked exhaust gas captured along a movable shaft associated with a turbine, for example, the movable shaft 167 associated with the turbine 98 as illustrated in FIGS. 1-3. Exhaust leakage flow may be managed by an exhaust leakage management system, for example, the exhaust leakage management system 132 diverting leaked exhaust either through the first passage 135 or through the second passage 137, depending on engine operating parameters. The position of a valve, for example, the valve 139 may regulate the flow of leaked exhaust gas either through the first passage to the crankcase 26 or through the second passage to the downstream portion 103 of the exhaust pipe, upstream of the one or more emission control devices 104.

Instructions for carrying out method 400 and the rest of the methods included herein may be executed by a controller, for example, the controller 107, based on instructions stored on a memory of the controller and in conjunction with signals received from sensors of the engine system, such as the sensors 111, including NOx sensors, UEGO sensors, pressure sensors, etc., described above with reference to FIG. 1. The controller may employ engine actuators of the engine system to adjust engine operation, according to the methods described below. In one example, based on input from sensors 111, the controller 107 may employ the actuator coupled to the valve 139 of the exhaust management system 132 to adjust the position of the valve 139.

The method 400 begins at 402 by determining engine operating parameters including engine speed, engine load, emission control device temperature, exhaust pressure, etc. At 404, the method 400 determines emission levels. The emission levels may be determined based on input from sensors along the exhaust pipe, sensing parameters downstream of the one or more emission control devices, such as the one or more emission control devices 104 illustrated in FIG. 1. The one or more emission control devices may include one or more of a three-way catalyst (TWC), hydrocarbon trap, particulate filter, muffler, oxidation catalyst, lean NOx trap (LNT), selective catalytic reduction (SCR) system, or other suitable emission control device. The emission parameters may include NOx levels, oxygen level, particulate material load in the exhaust gas, emission control device temperature, etc. The emission parameters may be relayed by sensors located along the exhaust pipe to a controller, for example the sensors 111 providing input to the controller 107 of FIG. 1.

The method 400 then proceeds to 406 to determine if one or more of the determined emission levels are above a respective threshold level. If yes, method 400 proceeds to 408, which will be explained in more detail below. If no, the method 400 proceeds to 418, and determines if pressure at the downstream portion of the exhaust pipe (for example, at the downstream portion 103 of the exhaust pipe illustrated in FIG. 1) is above a first threshold pressure. In one example, the first threshold pressure may be close to the pressure at the turbine upstream of the exhaust pipe.

If the pressure at the downstream portion of the exhaust pipe is above the first threshold pressure, the method 400 proceeds to 419, where exhaust gases leaked from the movable shaft are directed to flow through a first flow path to the crankcase of the engine. Minimal to no pressure difference between the turbine and the downstream exhaust pipe may prevent the flow of the leaked exhaust gas from the high pressure area of the turbine to an equal or higher pressure area at the downstream portion of the exhaust pipe. Therefore, the leaked exhaust gas from the turbine are directed to the crankcase through the first flow path. In one example illustrated in FIG. 1, the first flow path may include flowing leaked exhaust gases from the movable shaft 167 through the valve 139, which in a first position directs leaked exhaust gas to flow through the first passage 135 coupled to the crankcase 26 of the engine, thereby preventing exhaust from flowing to atmosphere. The first passage 135 may be fluidically coupled with the crankcase 26 via the oil return line 130, via the cam cover 64, via the cylinder head 60, or via the breather passage 92 of the PCV system 80. The method 400 then returns.

In another example, the lower pressure of the crankcase may enable flow of leaked exhaust gas to the crankcase from an area where a wastegate associates (e.g., inserts into) with the turbine. Exhaust pressure at the area where the wastegate associates with the turbine may be higher than the pressure of the crankcase but may be equal to or lower than exhaust pressure at the exhaust pipe, resulting in flow of leaked exhaust gas from the higher pressure area of the wastegate to the lower pressure crankcase, as is discussed above with reference to FIG. 1.

If at 418 the pressure at the downstream portion of the exhaust pipe is not above the first threshold pressure, method 400 proceeds to 420. The pressure drop between the turbine and the exhaust pipe may be conducive for flowing the leaked exhaust gas from the high pressure area of the turbine to the lower pressure are of the exhaust pipe. At 420, the leaked exhaust gases are directed to flow through a second flow path to the downstream portion of the exhaust pipe. In one example illustrated in FIG. 1, the second flow path may include flowing leaked exhaust gas from the movable shaft 167 through the valve 139, which in a second position directs leaked exhaust gas to flow through the second passage 137 to the downstream portion 103 of the exhaust pipe, upstream of the at least one emission control device. The leaked exhaust gases may then flow through the at least one emission control device to atmosphere. The method 400 then returns.

Returning to 406, if the emission levels are above the respective threshold levels, the method 400 proceeds to 408, where exhaust is directed to flow through the first flow path to the crankcase as described above with reference to FIGS. 1-3 and not to the downstream exhaust pipe. In one example, the one or more emission control devices along the exhaust pipe may be saturated, for example, a particulate matter filter may have reached maximum capacity (at the threshold level), and continuing to direct leaked exhaust gas to the downstream portion of the exhaust pipe, upstream of the particulate matter filter may compromise emission compliance. Similarly, the other emission control devices reaching the respective threshold levels may not be able to effectively trap specific constituents present in the leaked exhaust gas, degrading emissions. In another example, if the one or more emission control device is below the light off temperature (during cold-start conditions), flowing leaked exhaust gas to the exhaust pipe and through the emission control device may degrade emissions. Diverting leaked exhaust gas to the crankcase instead of the downstream exhaust pipe may thus prevent degradation of the emissions.

At 410, the method 400 determines exhaust pressure. Pressure may be determined along various locations of the engine, including at the turbine, the crankcase, the exhaust pipe etc. The pressure may be determined based on input from pressure sensors at specific locations or may be inferred based on exhaust flow rate, temperature etc. At 412, the method determines if crankcase pressure is above a second threshold pressure. The second threshold pressure may be equal to or close to atmospheric pressure. The crankcase pressure is generated by blow-by exhaust gases from the combustion chamber that are diverted to the crankcase. The crankcase pressure may be maintained close to atmospheric pressure as higher pressure in the crankcase may result in oil leaks. A PCV valve, for example, the valve 90 illustrated in FIG. 1 may prevent the pressure inside the crankcase by becoming too high by venting some of the pressure. If the crankcase pressure is not above the second threshold pressure, the method 400 proceeds to 416, and continues to flow leaked exhaust gasses through the first flow path to the crankcase. The method 400 then returns. In one example, during low engine load, the amount of blow-by gas may not be very high and the pressure at the crankcase may be below the second threshold pressure and enabling the leaked exhaust gas to be directed to the crankcase.

If at 412, the crankcase pressure is above the second threshold pressure, the method 400 proceeds to 416. The conditions where the pressure inside the crankcase may be higher than the second threshold pressure may include, during high engine load with large throttle opening, during malfunctioning or blockage of the PCV valve preventing venting of pressure from the crankcase etc. During such conditions it may not be desirable to direct additional leaked exhaust gas to the crankcase, which may further increase the pressure inside the crankcase. At 416, the method 400 flows the leaked exhaust gas through the second flow path fluidically connecting to the downstream exhaust pipe. The leaked exhaust gas may flow from the downstream exhaust pipe to the at least one or more emission control device and then to atmosphere. The method 400 then returns.

In this way, flow of leaked exhaust gases may be managed by an exhaust management system, directing leaked exhaust gas to flow through a three-way valve either to a first passage fluidically connected to the crankcase of the engine or to the second passage fluidically connected to the downstream exhaust portion of the exhaust pipe, minimizing degradation of emissions due to escape of leaked exhaust gas from movable mechanisms in contact with exhaust gas flow.

The various actions of FIG. 4 may be carried out by an electronic controller operating in combination with sensors and actuators as noted herein, including the control valve 139 as one example valve controlled by an actuator. Also, in some examples, once exhaust flow is directed one way by the valve (e.g., to the crankcase), all flow is stopped to other passages (e.g., through the second flow path, and vice versa. As such, in some example, directing exhaust flow may include directing the flow only to the first path, and not the second path responsive to determination of selected operating conditions, and only to the second path, and not the first path responsive to determination of alternative operating conditions different than the selected operating conditions.

The technical effect of managing the flow of the leaked exhaust gas either to the engine crankcase and/or to the exhaust pipe based on emission levels and engine operating conditions is preventing degradation of emissions due to the leaked exhaust gas escaping to atmosphere. Additionally, directing at least some of the leaked exhaust gas to the engine crankcase while maintaining the crankcase pressure within a desired range may enable efficient crankcase operation.

An example exhaust leakage management system, including a port disposed to capture a leaked exhaust gas from an insertion region of an exhaust gas flow component, a first passage at a bifurcation of the port, the first passage fluidically connecting the port to an engine crankcase, a second passage at the bifurcation of the port, the second passage fluidically connecting the port to a downstream portion of an exhaust pipe, and a three-way valve at the bifurcation of the port, the three-way valve regulating flow of the leaked exhaust gas through the port to the first passage and to the second passage. A second example of the system optionally includes the first example and further includes, wherein the insertion region is along a movable shaft inserted into a turbine. A third example of the system optionally includes one or more of the first and second examples, and further includes wherein an enclosure is in sealing engagement with the port, the port intersecting with a pair of bushings encircling the movable shaft, the enclosure defining a volume around the bushings. A fourth example of the system optionally includes one or more of the first through the third examples, and further includes wherein the first passage is fluidically coupled to the engine crankcase via an oil return line for a bearing of a turbocharger. A fifth example of the system optionally includes one or more of the first through the fourth examples, and further includes wherein the first passage is fluidically coupled with the engine crankcase via a cam cover. A sixth example of the system optionally includes one or more of the first through the fifth examples, and further includes wherein the second passage is fluidically coupled to the downstream portion of the exhaust pipe, upstream of at least one emission control device. A seventh example of the system optionally includes one or more of the first through the sixth examples, and further includes wherein the three-way valve is coupled to an actuator, the actuator actuated by a controller responsive to an engine operating condition. An eighth example of the system optionally includes one or more of the first through the seventh examples, and further includes wherein the controller includes instructions to actuate the actuator responsive to a first engine operating condition including an emission level above an emission threshold and a crankcase pressure below a first threshold pressure, thereby to position the three-way valve to direct the leaked exhaust gas to flow from the port through the first passage to the engine crankcase. A ninth example of the system optionally includes one or more of the first through the eighth examples, and further includes wherein the controller includes instructions to actuate the actuator responsive to a second operating condition including the emission level below the emission threshold and a pressure of the downstream portion of the exhaust pipe below a second threshold pressure, thereby to position the three-way valve to direct the leaked exhaust gas to flow from the port through the second passage to the downstream portion of the exhaust pipe. An example method, comprising responsive to a first condition, responsive to a first condition, positioning a three-way valve in a first position to flow leaked exhaust gas from a port through a first passage to an engine crankcase, the port capturing the leaked exhaust gas from an insertion portion of a moveable shaft, the three-way valve positioned at a bifurcation of the port, and responsive to a second condition, positioning the three way valve in a second position to flow leaked exhaust gas from the port through a second passage to a downstream portion of an exhaust pipe. A first example of the method further comprising responsive to both the first condition and the second condition, flowing leaked exhaust gas from a wastegate to the engine crankcase. A second example of the method optionally includes the first example and further includes, wherein the first condition includes an emission level above an emission threshold and a crankcase pressure below a first threshold pressure. A third example of the method optionally includes one or more of the first and second examples, and further includes wherein the second condition includes the emission level below the emission threshold and the exhaust pipe pressure below a second threshold pressure. A fourth example of the method optionally includes one or more of the first through third examples, and further includes flowing the leaked exhaust gas through the second passage to the downstream portion of the exhaust pipe and then through one or more emission control devices.

Another example system, comprising an exhaust leakage management system, a turbocharger including an turbine in a turbine housing, a movable shaft coupled to the turbine through the turbine housing, an enclosure in sealing engagement with an insertion portion of the movable shaft, a first fluid path from the enclosure to a positive crankcase ventilation (PCV) system to flow exhaust gas leaked from the insertion portion to a crankcase of the engine, a second fluid path from the enclosure to a downstream portion of an exhaust pipe to flow exhaust gas leaked from the insertion portion to the downstream portion of the exhaust pipe, a three-way valve regulating flow of the leaked exhaust gas from the enclosure to the first fluid path and to the second fluid path, and a controller to position the three-way valve. A first example of the system includes wherein the insertion portion includes the movable shaft disposed within a space between a bushing. A second example of the system optionally includes the first example and further includes, wherein the enclosure defines a volume around the bushing. A third example of the system optionally includes one or more of the first and second examples, and further includes wherein the movable shaft is actuated by a lever. A fourth example of the system optionally includes one or more of the first through the third examples, and further includes wherein the movable shaft is actuated by a diaphragm. A fifth example of the system optionally includes one or more of the first through the fourth examples, and further includes wherein a port including a radial groove in line with the space between the bushing is disposed to intersect with the movable shaft to direct flow of leaked exhaust gas from the insertion portion to the three-way valve.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An exhaust gas leakage management system of an engine comprising:
   a port disposed to capture a leaked exhaust gas from an insertion region of an exhaust gas flow component;
   a first passage at a bifurcation of the port, the first passage fluidically connecting the port to an engine crankcase;
   a second passage at the bifurcation of the port, the second passage fluidically connecting the port to a downstream portion of an exhaust pipe; and
   a three-way valve at the bifurcation of the port, the three-way valve regulating flow of the leaked exhaust gas through the port to the first passage and to the second passage.

2. The exhaust gas leakage management system of claim 1, wherein the insertion region is along a movable shaft inserted into a turbine.

3. The exhaust gas leakage management system of claim 2, wherein an enclosure is in sealing engagement with the port, the port intersecting with a pair of bushings encircling the movable shaft, the enclosure defining a volume around the bushings.

4. The exhaust gas leakage management system of claim 2, wherein the insertion region is along a wastegate valve shaft associated with the turbine.

5. The exhaust gas leakage management system of claim 1, wherein the first passage is fluidically coupled to the engine crankcase via an oil return line for a bearing of a turbocharger.

6. The exhaust gas leakage management system of claim 1, wherein the first passage is fluidically coupled with the engine crankcase via a cam cover.

7. The exhaust gas leakage management system of claim 1, wherein the second passage is fluidically coupled to the downstream portion of the exhaust pipe, upstream of at least one emission control device.

8. The exhaust gas leakage management system of claim 1, wherein the three-way valve is coupled to an actuator, the actuator actuated by a controller responsive to an engine operating condition.

9. The exhaust gas leakage management system of claim 8, wherein the controller includes instructions to actuate the actuator responsive to a first engine operating condition including an emission level above an emission threshold and a crankcase pressure below a first threshold pressure, thereby to position the three-way valve to direct the leaked exhaust gas to flow from the port through the first passage to the engine crankcase.

10. The exhaust gas leakage management system of claim 9, wherein the controller includes instructions to actuate the actuator responsive to a second operating condition including the emission level below the emission threshold and a pressure of the downstream portion of the exhaust pipe below a second threshold pressure, thereby to position the three-way valve to direct the leaked exhaust gas to flow from the port through the second passage to the downstream portion of the exhaust pipe.

11. A method, comprising:
    positioning a valve in a first position to flow leaked exhaust from a port through a first passage to an engine crankcase, the port capturing leaked exhaust from an insertion portion of a moveable shaft, the valve positioned at a bifurcation of the port; and
    positioning the valve in a second position to flow leaked exhaust from the port through a second passage to a downstream portion of an exhaust pipe.

12. The method of claim 11, further comprising responsive to both a first condition and a second condition, flowing leaked exhaust from a wastegate to the engine crankcase.

13. The method of claim 12, further comprising responsive to the first condition, positioning the valve in the first position, wherein the first condition includes an emission level above an emission threshold and a crankcase pressure below a first threshold pressure.

14. The method of claim 12, further comprising responsive to the second condition, positioning the valve in the second position, wherein the second condition includes the emission level below the emission threshold and the exhaust pipe pressure below a second threshold pressure.

15. The method of claim 14, further comprising flowing leaked exhaust through the second passage to the downstream portion of the exhaust pipe and then through one or more emission control devices.

16. An exhaust gas leakage management system comprising:
    a turbocharger including an exhaust turbine in a turbine housing;
    a movable shaft coupled to the exhaust turbine through the turbine housing;
    an enclosure in sealing engagement with an insertion portion of the movable shaft;
    a first fluid path from the enclosure to a positive crankcase ventilation (PCV) system to flow exhaust gas leaked from the insertion portion to a crankcase of the engine;
    a second fluid path from the enclosure to a downstream portion of an exhaust pipe to flow exhaust gas leaked from the insertion portion to the downstream portion of the exhaust pipe;
    a three-way valve regulating flow of the leaked exhaust gas from the enclosure to the first fluid path and to the second fluid path; and
    a controller to position the three-way valve.

17. The exhaust gas leakage management system of claim 16, wherein the insertion portion includes the movable shaft disposed within a space between a bushing.

18. The exhaust gas leakage management system of claim 17, wherein the enclosure defines a volume around the bushing.

19. The exhaust gas leakage management system of claim 16, wherein the movable shaft is actuated by a lever.

20. The exhaust gas leakage management system of claim 17, wherein a port including a radial groove in line with the space between the bushing is disposed to intersect with the movable shaft to direct flow of leaked exhaust gas from the insertion portion to the three-way valve.

* * * * *